US011361599B2

(12) United States Patent
Herman et al.

(10) Patent No.: US 11,361,599 B2
(45) Date of Patent: Jun. 14, 2022

(54) VEHICLE DAMAGE DETECTION

(71) Applicant: Ford Global Technologies, LLC, Dearborn, MI (US)

(72) Inventors: David Michael Herman, Southfield, MI (US); Antonios Koumpias, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 611 days.

(21) Appl. No.: 16/109,996

(22) Filed: Aug. 23, 2018

(65) Prior Publication Data

US 2020/0066067 A1     Feb. 27, 2020

(51) Int. Cl.

| G07C 5/08 | (2006.01) |
|---|---|
| G05D 1/02 | (2020.01) |
| G05D 1/00 | (2006.01) |
| B60K 28/10 | (2006.01) |
| B60R 21/01 | (2006.01) |
| G01C 21/34 | (2006.01) |

(52) U.S. Cl.
CPC .......... G07C 5/0808 (2013.01); B60K 28/10 (2013.01); B60R 21/01 (2013.01); G01C 21/3453 (2013.01); G05D 1/0088 (2013.01); G05D 1/0214 (2013.01); G07C 5/085 (2013.01); B60R 2021/01013 (2013.01); G05D 2201/0213 (2013.01)

(58) Field of Classification Search
CPC ........ G07C 5/0808; G07C 5/085; G07C 5/08; G07C 5/008; G05D 1/0214; G05D 1/0088; G05D 2201/0213; B60K 28/10; B60R 21/01; B60R 2021/01013; B60R 16/0234; G01C 21/3453; G01C 7/04; G01M 17/007; G01M 17/0078
See application file for complete search history.

(56) References Cited

U.S. PATENT DOCUMENTS

| 8,159,235 B2 | 4/2012 | Lynch et al. |
|---|---|---|
| 9,117,318 B2 | 8/2015 | Ricci |
| 9,645,041 B2 | 5/2017 | Mars |
| 2016/0364920 A1* | 12/2016 | Nelson .................. G07C 5/006 |
| 2017/0046462 A1 | 2/2017 | Pado et al. |
| 2017/0052150 A1* | 2/2017 | Zalameda .......... G01N 21/8803 |

(Continued)

FOREIGN PATENT DOCUMENTS

| CN | 101393079 B | 3/2009 |
|---|---|---|
| CN | 103900826 B | 7/2014 |
| CN | 106021639 A | 10/2016 |

OTHER PUBLICATIONS

Impact Location and Quantification on a Composite Panel using Neural Networks and a Genetic Algorithm K. Worden, W.J. Staszewski (Year: 2008).*

(Continued)

*Primary Examiner* — Abby Y Lin
*Assistant Examiner* — Renee LaRose
(74) *Attorney, Agent, or Firm* — Frank A. MacKenzie; Bejin Bieneman PLC

(57) ABSTRACT

A damage quantifier for a vehicle component formed of composite material is determined based on vehicle sensor data. The vehicle is operated based on a mission determined according to determined damage quantifier.

20 Claims, 13 Drawing Sheets

(56) References Cited

U.S. PATENT DOCUMENTS

2017/0330390 A1 11/2017 Benavides et al.
2018/0362190 A1* 12/2018 Chambers .............. B64D 45/00

OTHER PUBLICATIONS

Automotive Composite Structures for Crashworthiness Dirk H.-J.A. Lukaszewicz BMW AG, Research and Innovation Centre, Knorrstrasse 147, 80788, Munich, Germany (Year: 2013).*

Curtis, et. al., "The Effects of Environmental Exposure on the Fatigue Behaviour of CFRP Laminates", Composites, vol. 14. No. 3, Jul. 1983, pp. 294-300 (8 pages).

Schindler, et. al., "Location of Impacts in Composite Panels by Embedded Fibre Optic Sensors and Neural Network Processing", Smart Structures and Materials Symposium 1995, Smart Sensing, Processing and Instrumentation, Apr. 20, 1995, SPIE vol. 2444, pp. 481-490 retrieved from Internet URL: https://www.spiedigitallibrary.org/conference-proceedings-of-spie (10 pages).

Worden, et. al., "Impact Location and Quantification on a Composite Panel Using Neural Networks and a Genetic Algorithm", Strain 2000, vol. 36, No. 2, pp. 61-70 (8 pages).

Xiang Li, et. al., "Quantitative Damage Detection and Sparse Sensor Array Optimization of Carbon Fiber Reinforced Resin Composite Laminates for Wind Turbine Blade Structural Health Monitoring", retrieved from Internet URL: https://www.researchgate.net/publication/261882017 (25 pages).

Thiene, et. al., "Optimal Sensor Placement for Damage Detection Based on Ultrasonic Guided Wave", Key Engineering Materials 665, Sep. 2015 (5 pages).

Sofge, "Structural Health Monitoring Using Neural Network Based Vibrational System Identification", Proceedings of the Second Australia and New Zealand Conference on Intelligent Information Systems, 1994 (4 pages).

Addin, et. al., "Review on Prediction and Detection of Failures in Laminated Composite Materials Using Neural Networks", retrieved from Internet URL: https://www.bing.com/search?q=Review+on+prediction+and+detection+of+failures+in+laminated+composite+materials+using+neural+networks&form=IE11TR&src=IE11TR&pc=EUPP_DCJB (13 pages).

How Neural Networks Are Trained, retrieved from Internet URL: https://ml4a.github.io/ml4a/how_neural_networks_are_trained ( 30 pages).

Bushaev, "How Do We Train Neural Networks?", Nov. 27, 2017, retrieved from Internet URL: https://towardsdatascience.com/how-do-we-train-neural-networks-edd985562b73 (11 pages).

Peterson's Stress Concentration Factors, first chapter entitled "Definition and Design Relations", retrieved from Internet URL: https://media.wiley.com/product_data/excerpt/47/04700482/0470048247.pdf (56 pages).

Rocky Mountain Institute, "With BMW's i3, a major automaker shifts the EV market with composites", retrieved from Internet URL: https://rmi.org/news/blog_2013_08_29_bmw_i3_shifts_ev_market_with_composites (7 pages).

Tserpes, et. al., "Strain and Damage Monitoring in CFRP Fuselage Panels Using Fiber Bragg Grating Sensors. Part I: Design, Manufacturing and Impact Testing", Composite Structures 107 (2014), pp. 726-736 retrieved from Internet URL: www.elsevier.com/locate/compstruct (11 pages).

Ruzek, et. al., "Strain and Damage Monitoring in CFRP Fuselage Panels Using Fiber Bragg Grating Sensors. Part II: Mechanical Testing and Validation", Composite Structures 107 (2014), pp. 737-744, retrieved from Internet URL: www.elsevier.com/locate/compstruct (8 pages).

Huess, et. al., "Lightweight, Heavy Impact: How Carbon Fiber and Other Lightweight Materials Will Develop Across Industries and Specifically in Automotive", Advanced Industries, Feb. 2012 (24 pages).

Huetter, "Electric Cars: BMW Expands Range of Carbon-Fiber i3; Ford Will Have A 200-Mile EV", Repairer Driven News, May 4, 2016, retrieved from Internet URL: http://www.repairerdrivennews.com/2016/05/04/electric-cars-bmw-expands-range-of-i3-ford-will-have-a-200-mile-ev (3 pages).

Park, et. al., "Development of Piezoelectric Energy Harvesting Modules for Impedance-Based Wireless Structural Health Monitoring System", Korean Society Civil Engineers, Journal of Civil Engineering (2013) 17(4) pp. 746-752 (8 pages).

Koopman, et. al., "Challenges in Autonomous Vehicle Testing and Validation", 2016 SAE World Congress (10 pages).

Altabey, et. al., "An Extensive Overview of Lamb Wave Technique for Detecting Fatigue Damage in Composite Structures", Industrial and Systems Engineering, vol. 2, No. 1, 2017, pp. 1-20 (20 pages).

Loureiro, et. al., "Integration of Fault Diagnosis and Fault-Tolerant Control for Health Monitoring of a Class of MIMO Intelligent Autonomous Vehicles", IEEE Transactions on Vehicular Technology, vol. 63, No. 1, Jan. 2014, pp. 30-39 (10 pages).

Salowitz, et. al., "Bio-Inspired Intelligent Sensing Materials For Fly-by-Feel Autonomous Vehicles", IEEE 2012, (3 pages).

Duffer, "2017 BMW i3 Electric Vehicle Goes Longer on Style Than Miles", Chicago Tribune, Aug. 8, 2017 (3 pages).

Abdullah, et. al., "A Review on Finite Element Analysis Approaches in Durability Assessment of Automotive Components", Journal of Applied Sciences 8 (12), pp. 2192-2201 (2008) (10 pages).

Haiba, et. al., "Review of Life Assessment Techniques Applied to Dynamically Loaded Automotive Components", Pergamon Computers and Structures 80 (2002), pp. 481-494, retrieved from Internet URL: www.elsevier.com/locae/compstruc (14 pages).

Pissis, et. al., "Strain and Damage Sensing in Polymer Composites and Nanocomposites With Conducting Fillers", Science Direct, First International Conference on Structural Integrity, Procedia Engineering 114 (2015), pp. 590-597, retriever from www.elsevier.com/locate/procedia (8 pages).

Mujica, et. al., "A Review of Impact Damage Detection in Structures Using Strain Data", retrieved from Internet URL: https://upcommons.upc.edu (20 pages).

Ma, "An Attempt At Demystifying Bayesian Deep Learning" located at Internet URL: https://www.youtube.com/watch?v=s0S6HFdPtIA (19 pages).

Spiegel, "Damage Detection in Composite Materials Using PZT Actuators and Sensors for Structural Health Monitoring", The University of Alabama, 2014 (39 pages).

Su, et. al., "A Fast Damage Locating Approach Using Digital Damage Fingerprints Extracted from Lamb Wave Signals", J. Smart Materials and Structures, (2005), 14, pp. 1047-1054 (9 pages).

Mivehchi, et. al., "The Effect of Temperature on Fatigue Strength and Cumulative Fatigue Damage of FRP Composites," Procedia Engineering 2.1 (2010), pp. 2011-2020 (10 pages).

Meng, et. al., "Moisture Effects on the Bending Fatigue of Laminated Composites", Composite Structures, vol. 154, Oct. 15, 2016, pp. 49-60 (32 pages).

Wang, et. al., "Continuous Carbon Fibre Epoxy-Matrix Composite as a Sensor of its Own Strain", Smart Materials and Structures (1996), 5, 796 (6 pages).

Todoroki, et. al., "Strain and Damage Monitoring of CFRP Laminates by Means of Electrical Resistance Measurement", Journal of Solid Mechanical and Materials Engineering (2007), 1, pp. 947-974 (28 pages).

Bashmal, et. al., "Experimental and Numerical Investigations on the Mechanical Characteristics of Carbon Fiber Sensors", Sensors 17.9 (2017): 2026 (19 pages).

Pan, et. al., "A Survey on Transfer Learning", IEEE Transactions on Knowledge and Data Engineering 22.10 (2010), pp. 1345-1359 (15 pages).

Min,et al, "Impedance-Based Structural Health Monitoring Incorporating Neural Network Technique for Identification of Damage Type and Severity", Engineering Structures 39 (2012), pp. 210-220 (11 pages).

Aitkenhead, et. al., "A Neural Network Face Recognition System", J. Engineering Applications of Artificial Intelligence, 16 (2003), pp. 167-176 (10 pages).

Udd, "An Overview of Fiber-Optic Sensors", Review of Scientific Instruments, 66, pp. 4015-4030 (16 pages).

(56) References Cited

OTHER PUBLICATIONS

Wang, et. al., "Short Carbon Fiber Reinforced Epoxy as a Piezoresistive Strain Sensor", Smart Materials and Structures, 1995, 4, 363 (6 pages).
Wang, et. al., "Active Damage Localization Technique Based on Energy Propagation of Lamb Waves", J. Smart Structures and Systems, vol. 3, No. 2, (2007), pp. 201-217 (17 pages).

* cited by examiner

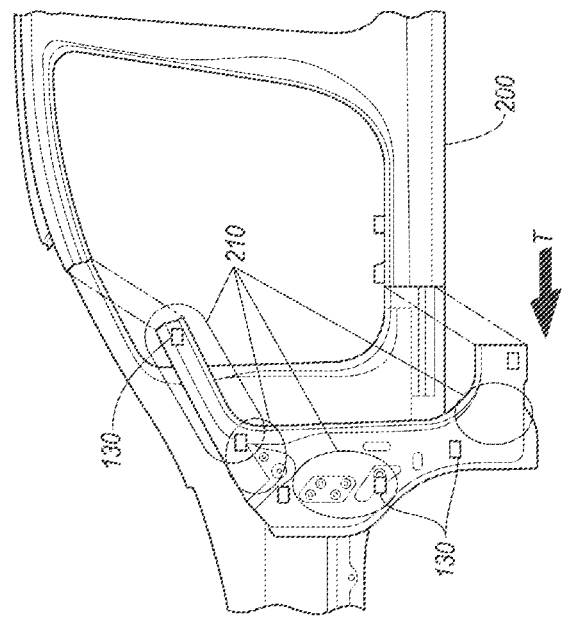
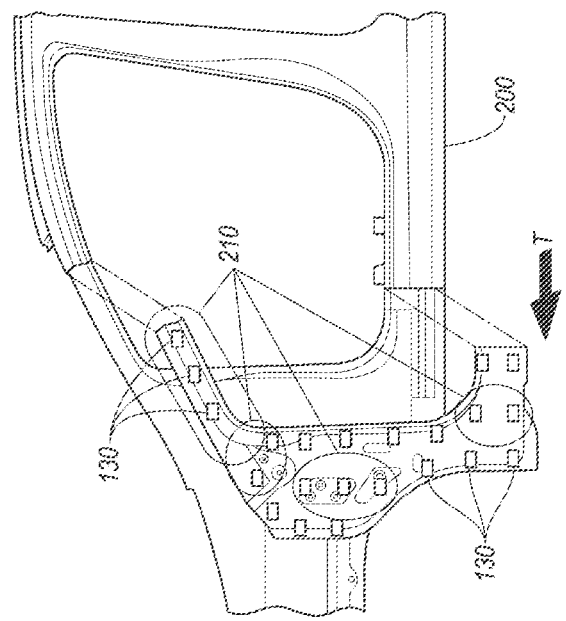

VEHICLE DAMAGE DETECTION

BACKGROUND

Carbon Fiber Reinforced Plastics (CFRPs) can be used, e.g., to manufacture machine parts such as vehicle body parts. CFRPs are typically used for improved strength, stiffness, tolerance, high resistance to corrosion, weight saving, etc. However, CFRP parts can become degraded or damaged, preventing a machine such as vehicle from operating, or prevent safe and/or efficient operation of the vehicle.

BRIEF DESCRIPTION OF THE DRAWINGS

FIG. 5A is a side view of the vehicle component with uniformly distributed sensors to detect component damage.

FIG. 5B is an exemplary side view of the vehicle component with selected sensor locations.

DETAILED DESCRIPTION

Introduction

Figure 1:
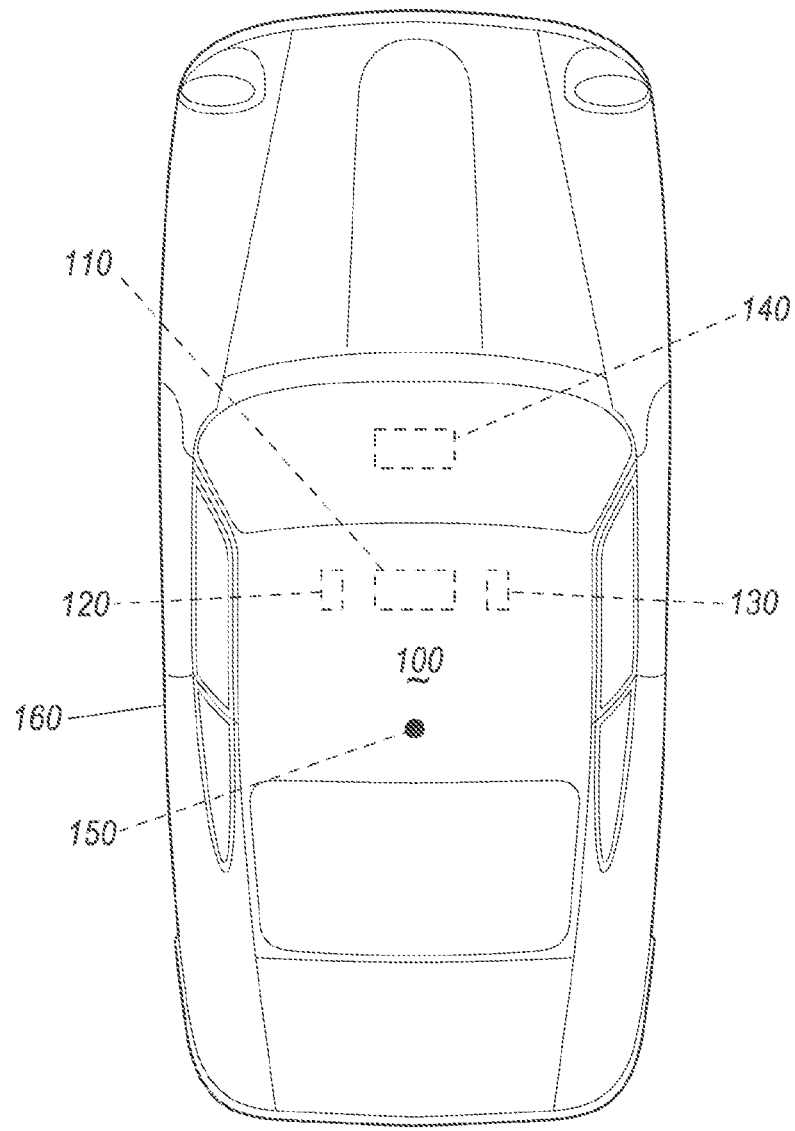
FIG. 1 is a diagram illustrating an example vehicle.

Disclosed herein is a method including determining a damage quantifier for a vehicle component formed of composite material based on vehicle sensor data, and operating the vehicle based on a mission determined according to determined damage quantifier.

Determining the mission may include selecting, based on the determined damage quantifier, a mode of navigation from at least one of cargo-only, cargo and passenger, move with no cargo or passenger, stop movement.

The method may further include selecting the mode of navigation based on a plurality of damage quantifier thresholds.

The method may further include predicting a change of the damage quantifier based on a planned route of the vehicle.

The method may further include predicting the change of the damage quantifier based on data environmental sensor data including at least one of a vehicle speed, an ambient temperature, and an ambient humidity.

The method may further include determining the damage quantifier based on a model that takes the received data from the sensors included in the vehicle component as input, and outputs the damage quantifier for the respective vehicle component.

The method may further include identifying stress locations in the vehicle components for one or more types of loading mode of the vehicle component, identifying a plurality of sensor locations in the vehicle component for the plurality of sensors based on the identified stress locations, and mounting the plurality of the sensors at the identified sensor locations.

The types of loading modes may include at least one of a roof impact, a frontal impact, a rear impact, and a side impact.

The method may further include selecting one or more types of loading modes for detection, and identifying the plurality of sensor locations based on the selected one or more types of loading modes.

Further disclosed herein is a system including a processor and a memory. The memory stores instructions executable by the processor to determine a damage quantifier for a vehicle component formed of composite material based on vehicle sensor data, and operate the vehicle based on a mission determined according to determined damage quantifier.

The instructions to determine the mission may further include instructions to select, based on the determined damage quantifier, a mode of navigation from at least one of cargo-only, cargo and passenger, move with no cargo or passenger, stop movement.

The instructions may further include instructions to select the mode of navigation based on a plurality of damage quantifier thresholds.

The instructions may further include instructions to predict a change of the damage quantifier based on a planned route of the vehicle.

The instructions may further include instructions to predict the change of the damage quantifier based on data environmental sensor data including at least one of a vehicle speed, an ambient temperature, and an ambient humidity.

The instructions may further include instructions to determine the damage quantifier based on a model that takes the received data from the sensors included in the vehicle component as input, and outputs the damage quantifier for the respective vehicle component.

The instructions may further include instructions to identify stress locations in the vehicle components for one or more types of loading mode of the vehicle component, and identify a plurality of sensor locations in the vehicle component for the plurality of sensors based on the identified stress locations.

The types of loading modes may include at least one of a roof impact, a frontal impact, a rear impact, and a side impact.

The instructions may further include instructions to select one or more types of loading modes for detection, and identify the plurality of sensor locations based on the selected one or more types of loading modes.

Further disclosed herein is a system including means for determining a damage quantifier for a vehicle component formed of composite material based on vehicle sensor data, and means for operating the vehicle based on a mission determined according to determined damage quantifier.

The system may further include means for identifying stress locations in the vehicle components for one or more types of loading mode of the vehicle component, means for identifying a plurality of sensor locations in the vehicle component for the plurality of sensors based on the identified stress locations, and means for mounting the plurality of the sensors at the identified sensor locations.

Further disclosed is a computing device programmed to execute any of the above method steps.

Yet further disclosed is a computer program product, comprising a computer readable medium storing instructions executable by a computer processor, to execute any of the above method steps.

Exemplary System Elements

A vehicle computer may be programmed to determine a damage quantifier for a vehicle component formed of composite material based on vehicle sensor data, and to operate the vehicle according to a determined damage quantifier. The computer may be programmed to alter a vehicle mission (e.g., a mode of navigation, vehicle path, etc.) based on detected damage, e.g., to reduce risk of injury, further damage, etc., e.g., because of a risk or occurrence of a structural failure or diminished crash worthiness. In one example, the vehicle computer may also actuate a vehicle actuator, e.g., a communication device, to request repair at a service center based on detected damage.

FIG. 1 illustrates a vehicle 100. The vehicle 100 may be powered in a variety of known ways, e.g., with an electric motor and/or internal combustion engine. The vehicle 100 may be a land vehicle such as a car, a truck, a drone, etc. A vehicle 100 may include a computer 110, actuator(s) 120, sensor(s) 130, a human machine interface (HMI 140), a reference point, and a body 160. A vehicle 100 reference point 150 is a specified point within the space defined by the vehicle body 160, e.g., a geometrical center point at which respective longitudinal and lateral center axes of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering.

The computer 110 may include programming to operate one or more land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic participants (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 of vehicles 100 may communicate with other traffic participants, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary vehicular communication networks include cellular, Bluetooth, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100.

The sensors 130 may include a variety of devices known to provide data to the computer 110. For example, one or more object detection sensors 130, e.g., radar, camera, lidar (Light Detection and Ranging), etc., fixed to vehicle 100 body 160 may provide locations of objects relative to the location of the vehicle 100. The sensors 130 may include camera sensor(s) 130, e.g. to provide a front view, side view, etc., providing images from an area surrounding the vehicle 100. For example, the computer 110 may be programmed to receive image data from a camera sensor(s) 130 and to implement image processing techniques to detect a road, lane markings, etc. The computer 110 may be further programmed to determine a current vehicle 100 location based on location coordinates, e.g., GPS coordinates, received from a vehicle 100 location (e.g., GPS) sensor 130. As another example, the computer 110 may be programmed to receive data including relative speed, location coordinates, and/or heading of other vehicles via the wireless communication network. Further, the vehicle 100 may include damage detection sensors 130 included vehicle 100 body 160 to detect various types of damages of body 160 component(s) 200, as discussed with respect to FIGS. 5A-5B.

The HMI 140 may be configured to receive information from a user, such as a human operator, during operation of the vehicle 100. Moreover, a HMI 140 may be configured to present information to the user. Thus, a HMI 140 may be located in the passenger compartment of the vehicle 100. In one example, the computer 110 may be programmed to output a message to the HMI 140 indicating a restriction of vehicle 100 operation, e.g., cargo transport only, navigation to nearest service center, etc., as discussed throughout this disclosure, e.g., FIG. 12.

The vehicle 100 may have a unibody construction (or monocoque), i.e., a unitary-body construction. In a unibody construction, the body 160 serves as a vehicle frame, and the body 160 (including the rockers, pillars, roof rails, etc.) is unitary, i.e., a continuous one-piece unit. The vehicle 100 body 160 may include a passenger compartment and an engine compartment. The body 160 (interior and/or exterior) may be formed of any suitable material, for example, metal, plastic, and/or fiber-reinforced material. At least a part of the vehicle 100 body can be formed of CFRP. For example, a substantial part of the body 160 may be formed of CFRPs a part which may be referred to as a carbon fiber monocoque. Additionally or alternatively, other vehicle 100 components 200 such as exterior parts may be formed of carbon fiber.

A carbon fiber reinforced polymer (CFRP), carbon fiber reinforced plastic or carbon fiber reinforced thermoplastic or often simply carbon fiber or carbon composite, all as used herein have plain and ordinary meanings that refer to an extremely strong and light fiber-reinforced plastic which contains carbon fibers. The binding polymer is often a thermoset resin such as epoxy, but other thermoset or thermoplastic polymers, such as polyester, vinyl ester or nylon, are sometimes used. The composite may contain aramid (e.g. Kevlar®, Twaron®), aluminum, ultra-high-molecular-weight polyethylene or glass fibers in addition to carbon fibers. The properties of a CFRP material can also be based on a type of additive introduced to the binding matrix (the resin). The most frequent additive is silica, but other additives such as rubber and carbon nanotubes can be used. The material may also be referred to as graphite-reinforced polymer or graphite fiber-reinforced polymer.

The vehicle 100 body 160 may be exposed to various "loading modes." In the present context, a "loading mode" specifies a direction of applying force to the body 160, e.g., side impact, frontal impact, top impact, etc., and/or an area of impact, e.g., roof, doors, front bumper, rear bumper, etc. Vehicles, such as vehicle 100, are subject to various standards related to various loading modes of the vehicles 100 as defined by Federal Motor Vehicle Safety Standards (FMVSS), Insurance Institute for Highway Safety (IIHS) standards, EURO NCAP (New Car Assessment Program), and/or NHTSA (National Highway Traffic Administration). A frontal impact may include, for example, head-on impact, angular frontal impact, small offset rigid barrier (SORB) impact, etc.

Figure 2B:
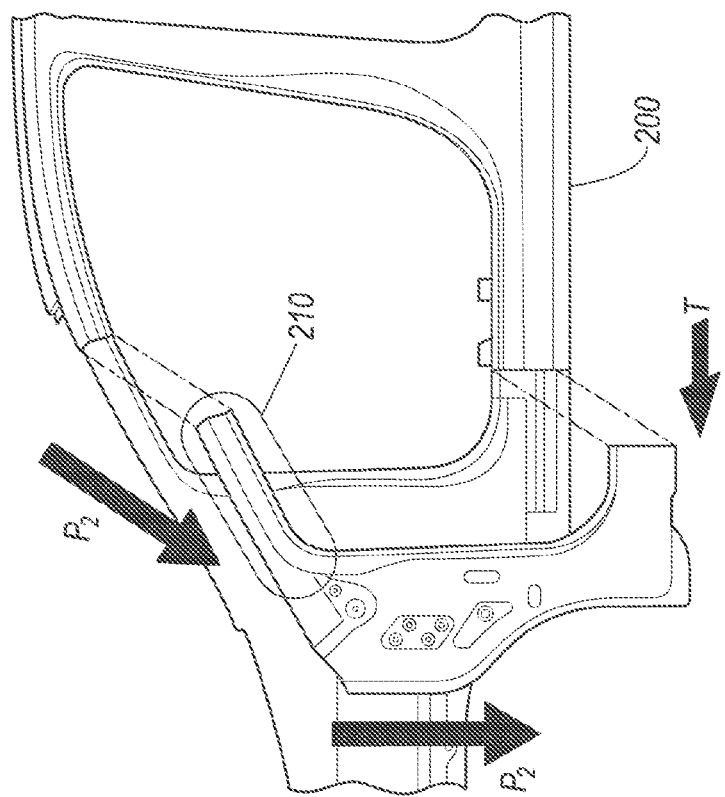
FIG. 2B is a side view of the body component of the vehicle, illustrating an example stress area based on a top impact loading mode.
Figure 2A:
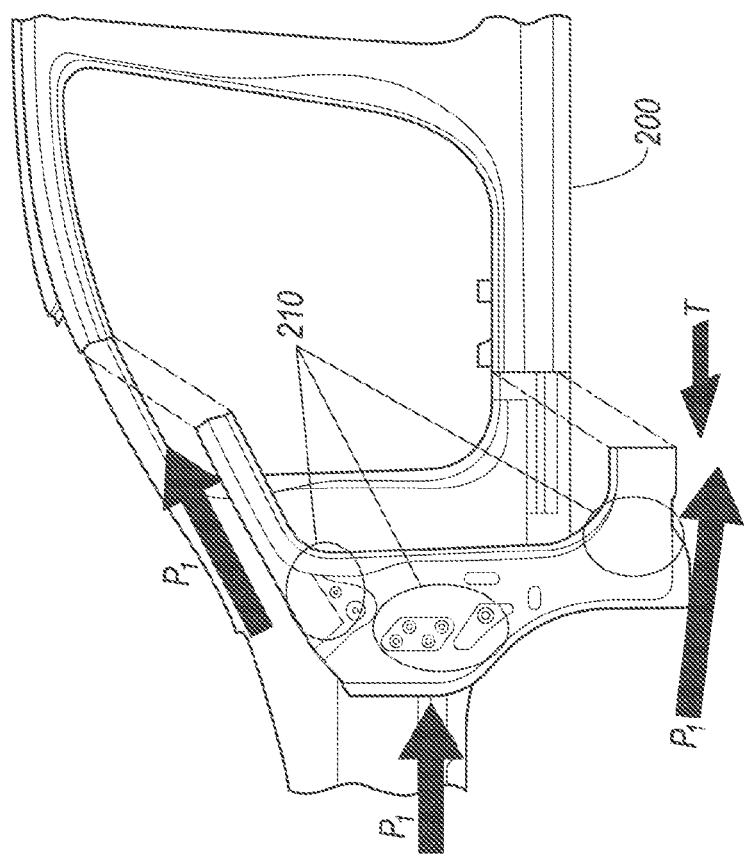
FIG. 2A is a side view of a body component of the vehicle of FIG. 1, illustrating example stress areas based on a front impact loading mode.

FIGS. 2A-2B illustrate an example body component 200, e.g., a front pillar assembly, in different loading modes. FIG. 2A shows the body component 200 with a first loading mode, e.g., front impact condition with an energy path $P_1$. The vehicle 100 may move in a travel direction T. In one example, a front impact, e.g., a frontal crash, is applied to the vehicle 100 in a direction substantially opposite to the travel direction T, and energy absorbed by the body 160 may travel in a direction of the energy path $P_1$. FIG. 2B shows the body component 200 with a second loading mode, e.g., roof impact condition with an energy path $P_2$. In one example, a roof impact (e.g., as a result of vehicle 100 roll over) may be applied to the vehicle 100 in a direction substantially vertical to the travel direction T, and energy absorbed by the component 200 may travel in a direction the energy path $P_2$.

Absorbing energy by the vehicle 100 components 200 typically results in a mechanical stress in the respective components 200. Typically, a stress applied to a component 200 is distributed non-uniformly, e.g., concentrated in stress locations 210, as shown in FIGS. 2A-2B. In the present context, a stress concentration location 210 is a volume of a component 200 at which a far field stress magnitude applied by the loading energy path to the component 200 is magnified. In one example, an internal stress concentration location 210 may have a spherical, an ellipsoidal, or any other suitable shape. As another example, an external stress concentration location 210 may have a shape of a notch or other abrupt change in the external surface of a component 200. A stress concentration location 210 (or stress location 210) in a component 200 may be based on a component 200 shape and constituent materials and/or a component 200 loading mode. Thus, in one example, a shape, e.g., dimensions of a stress concentration location 210, e.g., a diameter of a sphere surrounding a stress location 210, may be determined based on the shape and constituent materials and/or loading modes of the component using, e.g., finite element analysis (FEA), a handbook of stress concentration factors, etc. Location coordinates and/or dimensions of a stress location 210 may be specified based on a coordinate system, e.g., a Cartesian coordinate system with an origin at a vehicle 100 reference point 150. For example, as shown in FIGS. 2A-2B, the stress location(s) 210 of the component 200 may differ based on the loading mode. For example, the energy path $P_1$ of a frontal impact may cause multiple stress locations 210 (see FIG. 2A), whereas the energy path $P_2$ of a roof impact may cause a stress location 200 partially overlapping or different from the stress locations 210 of the frontal impact. The stress locations 210 may be identified using computer models of the component 200 and/or vehicle 100, as discussed with reference to FIG. 6.

Figure 3A:
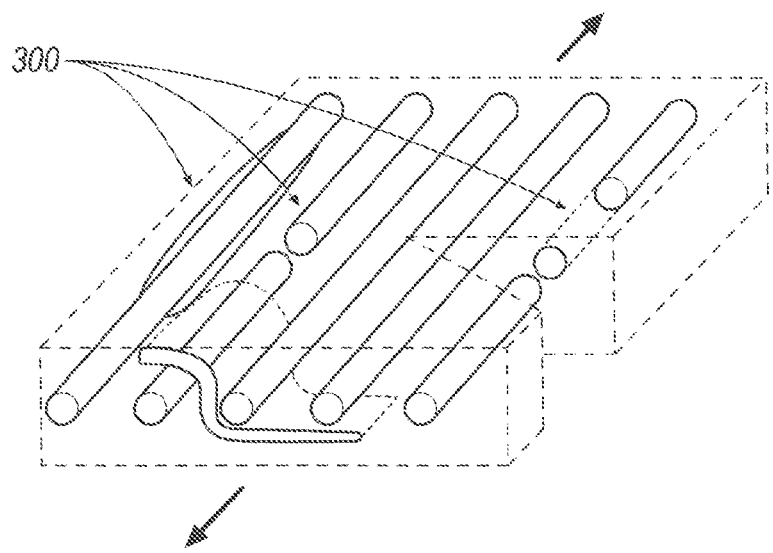
FIG. 3A is a diagram showing example degradation or damage to a CFRP part including a debonding, rupture, pull out, and bridging of a fiber-reinforced material.
Figure 3B:
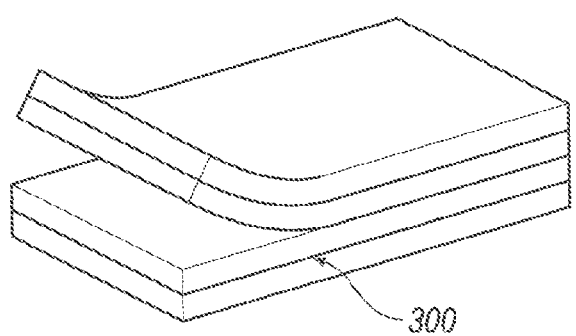
FIG. 3B is a diagram showing delamination damage of the fiber-reinforced material.

As discussed above, a component 200 may be formed of composite material such as a CFRP. When a composite material is loaded with a force, the force generates stress, e.g., in stress locations 210, as shown in FIGS. 2A-2B, which then may cause material damage 300. A force may be applied to the material because of (i) an impact of another object to the vehicle 100, e.g., a crash, (ii) the vehicle 100 operation such as acceleration, deceleration, driving over pothole, etc., (iii) aging of the component 200, (iv) thermal and/or mechanical cycling, (v) varying loading rate, and/or other sources of mechanical force. A stress to a component 200 may cause a damage 300 to the component. A damage 300, in the present context, is an irreversible physical change in a CFRP component 200. "Irreversible" means that the component 200 cannot return to its original physical structure after removal of the applied stress. For example, fracture or yielding of the material is an irreversible change, whereas elastic deformation, expansion or contraction of the material, based on an ambient temperature change or mechanical load is a reversible change. FIGS. 3A-3B illustrates multiple types of damage 300 that can occur in a composite material such as CFRP. FIG. 3A shows example damage 300 types including debonding, fiber rupture, matrix rupture, pull out, and bridging. FIG. 3B illustrate delamination as another type of damage 300.

In the present context, an extent of damage 300 with respect to an entire component 200 is measured with a "component damage quantifier D", whereas a local damage quantifier d specifies an extent of a damage 300 at a specified location of a component 200, e.g., at a stress location 210 of the component 200. The local damage quantifier d and component damage quantifier D may be specified in unitless numerical values, e.g., a number between 0 (zero), i.e., no damage, and 1, i.e., damaged material has no load carrying capability due to the damage (as discussed with respect to FIGS. 6A-6B). Thus, a local damage quantifier d of a component 200 may have different values based on a location within the component 200. For example, different local damage quantifier d values may be measured in different stress locations 210 in an example component 200. A local damage quantifier d may be determined based on data received from damage detection sensor(s) 130, e.g., a transducer, an ultrasonic sensor, etc., included in a component 200. A component damage quantifier D may be determined based on local damage quantifier(s) d of the component 200, environmental data, predicted future loading cycles, neural network models, etc. As discussed with reference to FIG. 7, the computer 110 may be programmed to determine the local damage quantifiers d and component 200 damage quantifier D.

Figure 4:
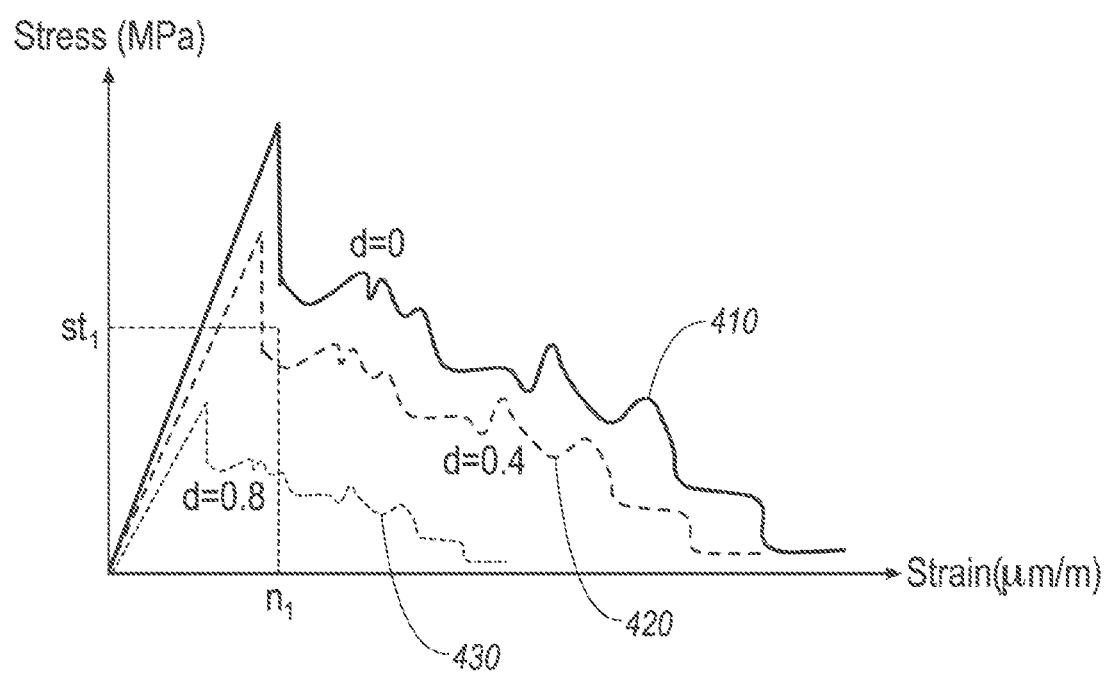
FIG. 4 shows multiple exemplary graphs of strain response of an example vehicle component.

FIG. 4 shows multiple graphs 410, 420, 430 of strain response of a component 200. In the present context and as is conventionally understood, a "strain" is a geometric response of a component, system, material, etc. to an applied stress, e.g., the force caused in a loading mode such as shown in FIGS. 2A-2B. The stress may be measured in units of MPa (Megapascal). In one example, the strain can be defined as an amount of a deformation, expansion, contraction, or shear in a 3D stress state, etc., in a direction of an applied force divided by an initial length of the material, e.g., component 200. CFRP components may exhibit anisotropic or isotropic elastic properties. An anisotropic response of the material may include different effective stiffness as a function of applied loading and coupling between in and out of plane strains. In addition, the yielding, damage initiation, and damage evolution of a CFRP component 200 may exhibit anisotropic or isotropic response. For example, a homogenous polymer composite with chopped fibers of random directions would be exhibited to exhibit an isotropic response whereas a layup of multiple CFRP layers with unidirectional long fibers at varying angles in each layup would be expected to be anisotropic in response. The strain value may be unitless and may be measured as a change of material length in units of original material length, e.g., in PPM (part per million), μm/m (micrometer per meter), etc. As shown in the example graphs 410, 420, 430, an increased amount of "local damage quantifier d" may cause a "strain" in the component 200 upon applying an even lower stress to the component 200. In other words, a component 200 with a higher damage quantifier d is more susceptible to failure, yielding, lower energy absorption, lower structural rigidity, etc.

To achieve an expected performance, e.g., with respect to safety standards such as small overlap rigid barrier (SORB), the component 200 may be designed to withstand a specified amount of stress, e.g., $st_1$ as shown in FIG. 4. In the present context, to "withstand" means to prevent a strain that exceeds a predetermined threshold $n_1$ unless the stress exceeds the threshold $st_1$. The example graphs 410, 420, 430 illustrates that a component 200 may fail to withstand the stress when a local damage quantifier d increases. For example, as shown in the example graph 430, the component 200 fails to withstand the stress when the damage quantifier d is equal 0.8. A failing component 200 may impact a vehicle 100 operation, e.g., not satisfying a safety standard.

With reference to FIGS. 5A-5B, the computer 110 may be programmed to determine a damage quantifier D for a vehicle 100 component 200 formed of composite material based on vehicle 100 sensor 130 data, and to operate the vehicle 100 based on a mission determined according to determined damage quantifier D. In the present context, a component damage quantifier D specifies a level of damage 300 associated with a component 200 based on determined local damage quantifiers d in various areas, e.g., stress locations 210, of the component 200 in form of a numerical value, e.g., in a range of 0 (zero), i.e., no damage, to 1, i.e., the component has no load carrying capability due to the damage, as discussed with respect to FIG. 7.

As discussed above with reference to FIGS. 2A-2B, a component 200 may have different stress locations 210 based on a loading mode, i.e., a magnitude and direction of a force vector at the location 210, e.g., front impact, roof impact, etc. With respect to FIGS. 5A-5B, the stress locations 210 shown include stress locations 210 of multiple loading modes, e.g., stress locations of both FIGS. 2A-2B. The computer 110 may be programmed to receive data associated with multiple loading modes of the component 200. FIG. 5A shows an example placement of sensors 130, e.g., substantially uniformly distributed in the composite material of the component 200, whereas FIG. 5B shows an example of specifically selected number and/or location of sensors 130 based on location of stress locations 210 of multiple loading modes in the respective component 200, as discussed below with respect to a process 1100 illustrated in FIG. 11.

With continued reference to FIGS. 5A-5B, the computer 110 may be programmed to receive data, e.g., electrical signals, packets, etc., from the sensors 130 and to determine the local damage quantifier d based on the received data. For example, the sensors 130 included in the component 200 may include a piezoelectric, a transducer, a capacitive sensor, a strain sensor, microelectromechanical system (MEMS), and/or a magnetostrictive device. In one example, illustrated in Table 1, an ultrasonic damage detection sensor 130 may include a transmitter and a receiver of ultrasonic signals.

TABLE 1

| Received ultrasonic signal intensity | Estimated local damage quantifier d |
|---|---|
| 90% | 0.1 |
| 80% | 0.2 |
| ... | |
| 20% | 0.8 |
| 0% | 1.0 |

In the example shown in Table 1, a sensor 130 transmitter and receiver may be mounted in a stress location 210. For example, the transmitter and receiver may be mounted on opposing sides of a spherical-shaped stress location 210, i.e., two ends connected by an imaginary line passing through a center of the spherical shaped stress location 210. The computer 110 may be programmed to actuate the transmitter to transmit an ultrasonic signal. A damage 300 in the stress location 210, in which the sensor 130 is located, may, e.g., reduce an intensity, change a shape, etc., of a received ultrasonic signal at the sensor 130 receiver. The computer 110 may be programmed to determine an intensity, shape, etc., of the ultrasonic signal received at the sensor 130 receiver. The computer 110 may be programmed to store data including an expected signal shape, intensity, etc. of the received ultrasonic signal based on non-damaged and damaged material, and to determine the local damage quantifier d based on the stored data and the received ultrasonic signal. For example, with reference to Table 1, the computer 110 may be programmed to store a table including a relationship of (i) the local damage quantifier d and (ii) a percentage of received signal intensity compared to an expected signal intensity associated with a non-damaged material. Additionally or alternatively, the computer 110 may be programmed to determine a local damage quantifier d using any other suitable relationship, e.g., exponential, square, etc., of sensor 130 data and the local damage quantifier d. Additionally or alternatively, the computer 110 may be programmed to determine a local damage quantifier d based on a neural network that is trained based on ground truth data, as discussed with respect to FIG. 6.

With reference to FIG. 5B, a number and/or location of sensors 130 may be identified as a part of a design of the component 200 and/or the vehicle 100 body 160. For example, a lab computer may be programmed to identify the number and/or locations of the sensors 130 on, within, or adjacent (e.g., touching) a component 200 to monitor local damage quantifier(s) d based on a Failure Mode Effect Analysis (FMEA) technique, a computer aided engineering simulation such as a Finite Element Analysis (FEA), Computational Fluid Dynamics (CFD), and/or other computational techniques. In one example, the lab computer may be programmed to identify location and number of damage detection sensors 130 by minimization of a covariance of estimated parameters, Guyan model reduction, effective independence, kinetic energy, neural networks, genetic algorithm, simulated annealing, etc. Additionally or alternatively, the lab computer may be programmed to identify locations of damage detection sensors 130 based on a sparse array sensor optimization technique The lab computer maybe programmed to identify stress locations 210 in the vehicle 100 components 200 for one or more loading modes, e.g., a roof impact, a frontal impact, a rear impact, and a side impact (see FIGS. 2A-2B). Further, the lab computer may be programmed to identify sensor 130 locations in the vehicle 100 component 200 based on the identified stress locations 210. The sensors 130 may be then placed or mounted at the identified sensor 130 locations. In the present context, "at" the identified location includes in, on, proximate to (i.e., within a predetermined distance from, e.g., 1 centimeter), and/or touching the component 200.

To program the vehicle 100 computer 110 to determine a component damage quantifier D and/or a local damage quantifier d, the lab computer may be programmed, using FEA, FMEA, etc., to generate training data (e.g., Table 2). As discussed below, a machine learning algorithm such as neural network may be trained based on the generated training data, and the vehicle 100 computer 110 may be programmed based on the trained neural network to determine the local damage quantifiers d, and/or component damage quantifier D.

TABLE 2

| Damage data | Location, dimensions, type of damage (e.g., rupture, debonding, etc.) |
| --- | --- |
| Loading mode | Front crash including impact force data. |
| Sensor characteristics data | Data describing relationship of physical attributes of material to sensor data |
| Sensor location data | Data specifying location of damage detection sensors in a component |
| Sensor Data | Data received from damage detection sensors associated with the damage in the component |
| First local damage quantifier | 0.3 |
| Second local damage quantifier | 0.7 |
| SORB safety rating | Marginal |
| NVH safety rating | Acceptable |

TABLE 2-continued

| Component damage quantifier D | 0.6 |
| --- | --- |

In the present context, training data, i.e., values specifying physical phenomena under baselines or various conditions. Training data typically includes input data describing an example damage 300, expected data from sensors 130 associated with the damage 300, and data describing how attributes such component damage quantifier D, etc. are estimated under such conditions (i.e., simulated damage 300). With reference to example Table 2, training data may include input data including (i) damage 300 data, e.g., dimensions of a damage 300, e.g., a crack, type of damage 300, e.g., rupture, etc., (ii) loading mode(s) applied to the damaged component 200, e.g., an amount and/or direction of force applied to the damaged component 200, (iii) sensor 130 characteristic data, e.g., data which specify a relationship of a physical attribute of the material to the received sensor 130 data and data specifying material characteristics, and (iv) sensor 130 location data specifying location coordinates of the sensors 130 with respect to a coordinate system, e.g., a Cartesian coordinate system with an origin at the reference point 150. Additionally or alternatively, the location coordinates of the sensors 130 may be specified with respect to other types of coordinate systems such as cylindrical, spherical, Curvilinear coordinates, Plücker coordinates, Canonical coordinates, etc.

The lab computer may be programmed to generate, based on the input data described above, the training output data including (i) sensor 130 data, e.g., signal data expected from the sensors 130 based on the sensor 130 locations, sensor 130 characteristics, damage 300 data, etc., (ii) damage quantifier(s) d based on damage 300 data, e.g., dimensions of damage 300 such as depth of the damage 300 (and, e.g., an example Table 1 specifying a relationship of data received from a sensor 130 and a local damage quantifier d), (iii) safety ratings, as discussed below, and (iv) the component damage quantifier D based on the damage quantifiers d, safety ratings, etc., as discussed below.

The lab computer may be programmed to estimate the signal that may be received from the sensors 130 based on the damage 300 to the composite material, e.g., based on known dimensions, etc. The lab computer may be programmed to generate the ground truth data based on a known location of the damage 300, simulating effects of the damage 300 on physical attributes of the material and based on sensor characteristics data which specify a relationship of a physical attribute of the material to the received sensor 130 data. In other words, the generated training data may include examples of how the received sensor 130 data change based on damages caused in various locations, levels of severity, and potentially types of damage (e.g. a specific type of damage mode of the CFRP) of the component 200. Additionally or alternatively, the lab computer may be programmed to generate the ground truth data based on measurement data received from lab measurement equipment such as X-Ray, ultrasound scanner, etc.

In the present context, a "safety rating" is a quantifier determining how safe is an operation of the respective component 200 of the vehicle 100. A vehicle 100 safety rating may be measured in a unitless scale, e.g., good, acceptable, marginal, poor, and/or a range, e.g., from 1 (good) to 5 (poor). A safety rating may be determined based on various safety standards such as SORB, and/or any other safety standard provided by EURO NCAP, NHTSA, etc.

Additionally or alternatively, a "safety rating" may be determined based on other vehicle 100 attributes such as vehicle 100 ride handling/quality, NVH (Noise Vibration Harshness), aerodynamic properties, etc. The lab computer may be programmed to determine the safety rating based on FEA techniques (e.g., based on estimating displacement, stress, acceleration, damage initiation, yielding dummy injury metrics, etc.) and to determine the safety rating of the component 200 based on the determined local damage quantifier(s) d, damage 300 data, etc.

The lab computer may be programmed to determine the safety rating of the component 200 based on the damage 300 data, component 200 data, e.g., dimensions, material, etc., vehicle 100 design (shape, dimensions, mechanical properties, etc.), loading mode, etc. In other words, based on known damage 300 to the component 200, the lab computer 110 may be programmed to simulate (or estimate) how far a safety rating is compromised, and further determine the safety rating based on known safety standards, e.g., SORB, etc.

Figure 6:
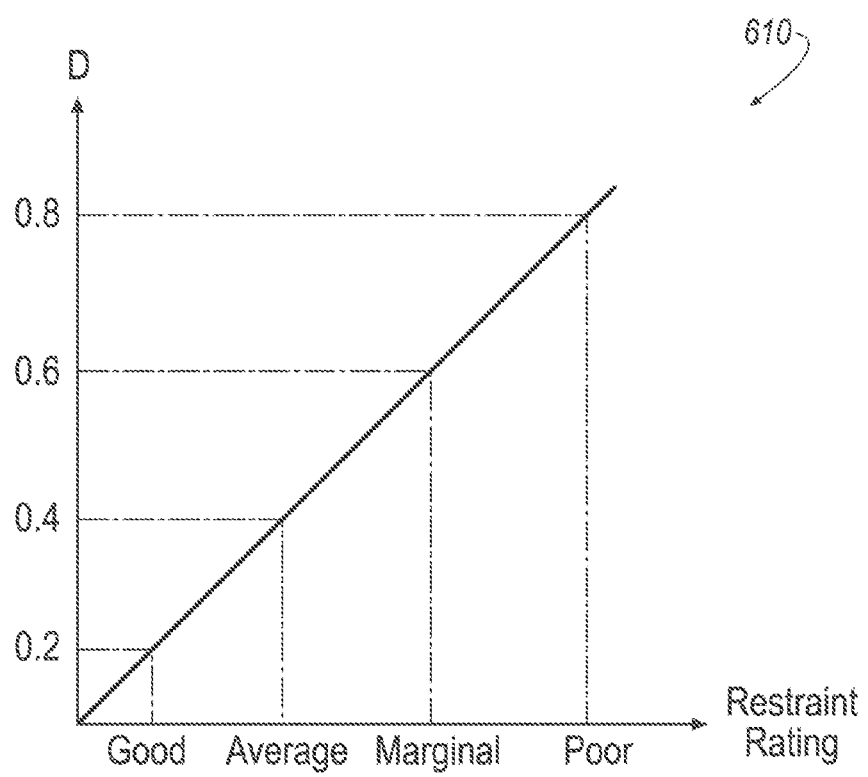
FIG. 6 shows an example graph of a vehicle safety rating and damage quantifier.
Figure 7:
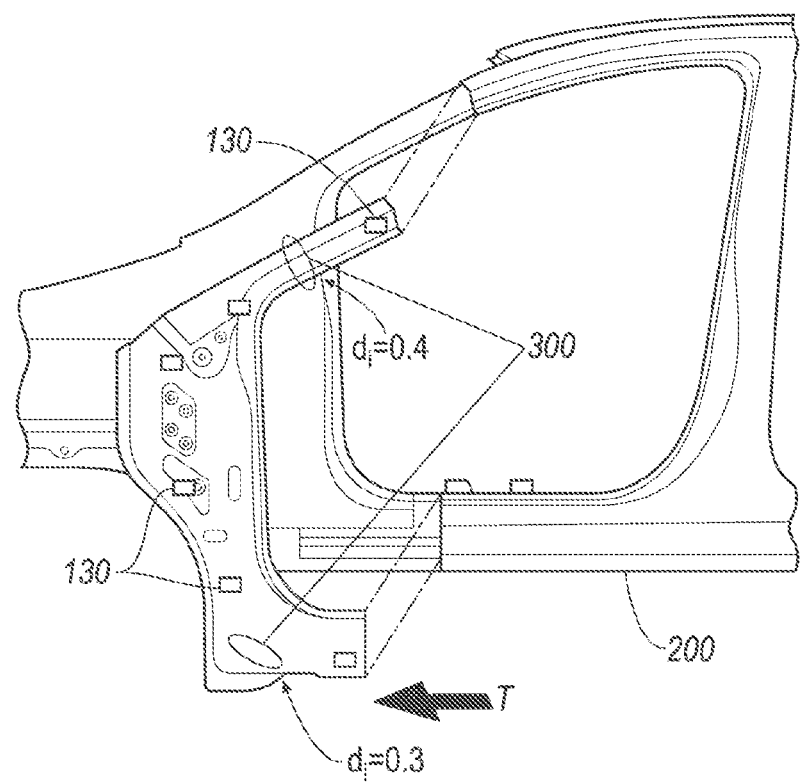
FIG. 7 shows the example component with multiple example damage locations.

In one example shown in FIG. 6, an example graph 610 shows a relationship of the component 200 safety rating and the component damage quantifier D. The lab computer may be programmed to determine the component damage quantifier D, based at least in part on the safety rating. Additionally or alternatively, the lab computer may be programmed to store any other relationship of safety ratings and the component damage quantifier D. Additionally or alternatively, as discussed below with reference to FIG. 10, the safety rating may be determined for a vehicle 100 rather than a vehicle 100 component 200.

The generated training data may be used to train a machine learning algorithm for determining component damage quantifier D, a vehicle damage quantifier D, etc. A "neural network" (NN) is a computing system implemented in software and/or hardware that is inspired by biological neural networks that constitute brain operation. A neural network learns to perform tasks by studying examples generally without being programmed with any task-specific rules. A neural network can be a software program that can be loaded in memory and executed by a processor included in a computer, for example the computer 110. The neural network can include n input nodes, each accepting a set of inputs i (i.e., each set of inputs i can include on or more inputs x). The neural network can include m output nodes (where m and n may be, but typically are not, a same number) provide sets of outputs $o_1 \ldots o_m$. A neural network typically includes a plurality of layers, including a number of hidden layers, each layer including one or more nodes. The nodes are sometimes referred to as artificial neurons, because they are designed to emulate biological, e.g., human, neurons. For example, a neural network may learn to determine a damage 300 in a component 200 by analyzing training data generated based on FEA techniques and/or real-world examples, e.g., measurement of sensor 130 data in components with and without damages in the composite material. For example, the neural network may learn to determine a component damage quantifier D based on local damage quantifiers d determined based on received sensor 130 data and known ground truth about location, dimension, etc., of damage(s) 300 in the respective component 200. Further, training of the neural network may continue after deployment of the component 200 and/or vehicle 100, e.g., to learn how the damages evolve in a vehicle 100 component 200 based on effects of environmental conditions, aging, etc., and/or improve detection of damages (see FIG. 13). Additionally or alternatively, other machine learning techniques, such as SVM (Support Vector Machine), decision trees, naïve-bayes, ensemble methods, etc. may be used to identify a relationship of damages in the component 200 and data received from the damage detection sensors 130.

The vehicle 100 computer 110 may be programmed (e.g., based on the training data discussed above) to determine the local damage quantifier d of a component 200 based on the data received from the sensor 130 included in the vehicle 100 component 200, and to determine the component damage quantifier D based on the determined local damage quantifier(s) d, location of the sensors 130, and/or distances of the sensors 130 to one another, etc. Herein below multiple examples for determining a component damage quantifier D are discussed.

In one example, the computer 110 may be programmed to determine the component damage quantifier D to be a maximum of local damage quantifiers d of the component 200. For example, upon determining the local damage quantifiers d (e.g., as discussed above regarding example Table 1) including 0.2, 0.3, 0.5, the computer 110 may determine the component damage quantifier D to be equal 0.5.

In another example, the computer 110 may be programmed to determine the component damage quantifier D based on machine learning, e.g., in a neural network which takes the local damage quantifier(s) d as input, then outputs the damage quantifier D for the respective vehicle 100 component 200. The neural network may be trained, based on the ground truth data, to determine the component damage quantifier D based on the received sensor 130 data. As discussed above, multiple sensors 130 may be included in a component 200. Thus, the computer 110 may be programmed based on a machine learning technique to receive data from multiple sensors 130 and to determine the damage quantifier D of the component 200 based on the received sensor 130 data.

Additionally or alternatively, the computer 110 may be programmed to determine the component damage quantifier D based on a mechanical model of the component 200. Thus, the computer 110 may be programmed to determine the damage quantifier D based on the determined local damage quantifiers d and the mechanical model, e.g., by utilizing FEA techniques. A component 200 may have a complex geometric and/or mechanical model, e.g., a complex geometry resulting in a fine mesh model using complex materials models to predict local/global component response. To reduce computation time, the computer 110 may be programmed to determine the component damage quantifier 200 based on a simplified (or abstract) mechanical model of the component 200. In the present context, a simplified mechanical model is a model that substantially includes physical properties of the component 200 although insignificant details are removed, e.g., a straight beam model may be used as a simplified model of a body 160 pillar. Additionally or alternatively, as discussed with respect to FIG. 11, the computer 110 may be programmed to determine a vehicle 100 damage quantifier $D_{vehicle}$ i.e., a damage quantifier that specifies an extent of damage for the vehicle 100.

Figure 8:
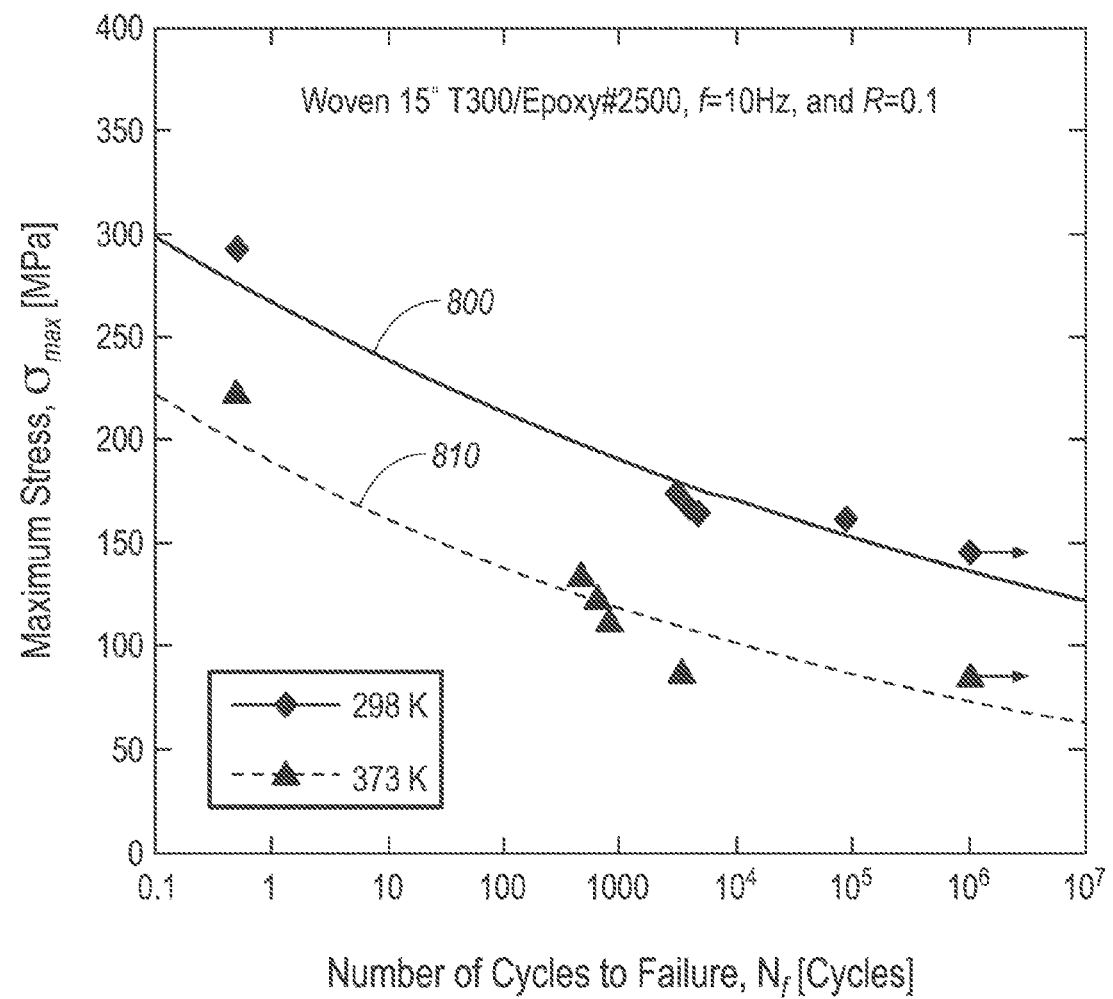
FIG. 8 shows an example graph of stress to the vehicle component versus changes of environmental conditions.

FIG. 8 shows examples graphs 800, 810 which illustrates applied stress, e.g., an amount of pressure measured in mega pascal (MPa) and a number of cycles to failure (i.e., a number of operation cycles until an example component 200 and/or a system fails to operate). In the present context, "failure" or "fails" means having a safety rating below a threshold, e.g., having "poor" safety rating based on SORB. The example graphs 800, 810 show two different environmental conditions (temperature) applied; the graph 800 shows the operation at a first temperature 298 degrees Kelvin (K), whereas the graph 810 shows the operations at a second temperature 373 degrees K.

As shown in the example graphs 800, 810, harsher environmental conditions such as increased temperature with respect to graph 810 in comparison to the graph 900, may result in a failure of a component 200 under lower stress levels. Additionally or alternatively, other environmental conditions such as humidity, air pressure, etc. may affect a number of operation cycles until a component 200 and/or a system, e.g., a vehicle 100 fails to operate. Additionally or alternatively, vehicle 100 physical attributes such as speed, acceleration, and/or road conditions, e.g., potholes, etc., may affect a number of operation cycles of a component 200 and/or vehicle 100 fails to operate. In the present context, an environmental parameter (or condition) include (i) ambient-related parameters such as temperature, pressure, humidity, etc., (ii) vehicle 100 physical attributes such as speed, acceleration, etc., and/or (iii) road conditions, e.g., potholes, roughness (dirt road versus paved road), etc.

With continued reference to FIG. 8, a change of an environmental condition may change a number of operation cycles until a component 200 and/o a system fails. A reduced number of operation cycles until failure may result in an increased damage quantifier D. In other words, a higher damage quantifier D means that a likelihood of an earlier failure of the respective component 200 and/or system.

Figure 9:
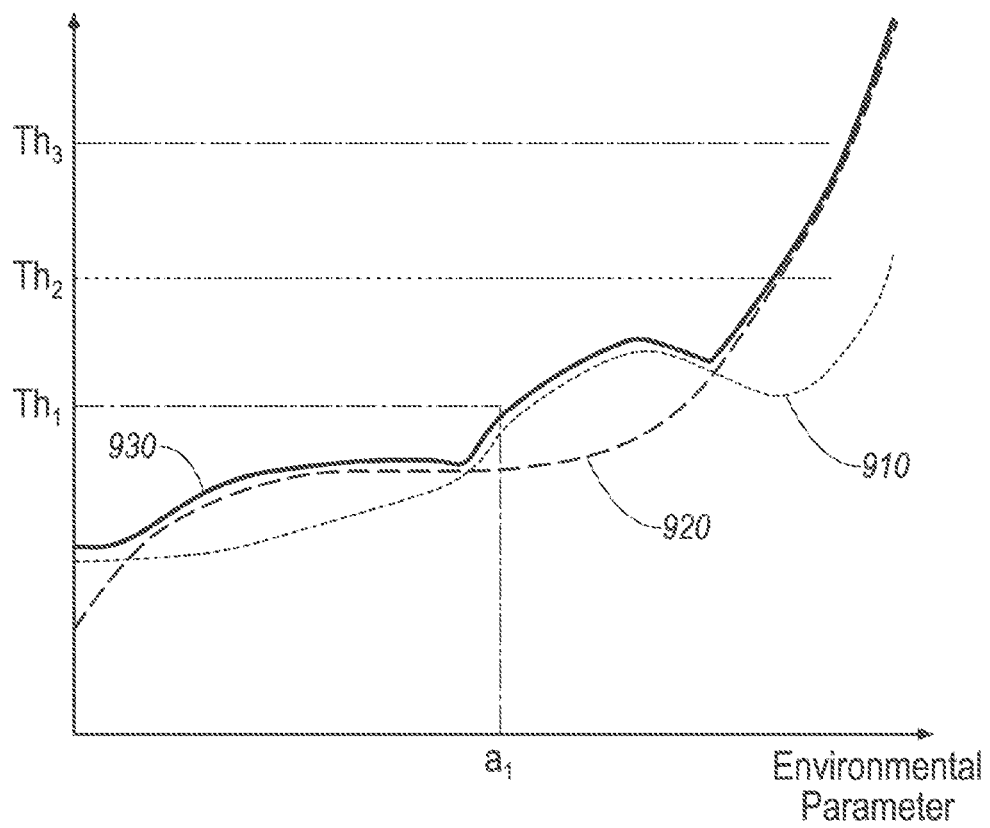
FIG. 9 shows multiple exemplary graphs of a vehicle component damage quantifier with respect to an environmental parameter.

As discussed above with reference to Table 2, a damage quantifier D may be related to a safety rating. For example, a component 200 with a damage 300 may have a higher likelihood of failure with respect to SORB standard whereas a lower likelihood of failure with respect to another safety standard, e.g., NVH. For example, with respect to FIG. 9, a first example graph 910 shows a change of a component 200 damage quantifier D with respect to a first standard, e.g., NVH, whereas a second example graph 920 shows a change of the component 200 damage quantifier D with respect to a second standard, e.g., SORB. The computer 110 may be programmed to predict a change of a damage quantifier D based on other data such as environmental conditions, cycles of use, etc., based on a combination of multiple safety standards, e.g., SORB and NVH.

In one example, the computer 110 may be programmed to determine a maximum value of damage quantifier D of multiple quantifiers D determined based on different safety ratings. For example, the example graph 930 shows a change of damage quantifier D based on the environmental parameter which is a maximum of damage quantifiers D determined based on the first and second safety standards, e.g., SORB, NVH. Additionally or alternatively, the computer 110 may be programmed to determine the damage quantifier D based on multiple safety standards, environmental conditions, etc. using various machine learning techniques, e.g., neural networks.

As discussed above, the computer 110 may be programmed to select a mission for the vehicle 100 based on the damage quantifier D and to navigate the vehicle 100 based on the selected mission. In the present context, a "mission" includes a mode of navigation including at least one of cargo-only, cargo and passenger, move with no cargo or passenger, stop movement, etc. For example, as shown in example Table 3, the computer 110 may be programmed to select a mode of navigation based on the component damage quantifier D and multiple damage quantifier thresholds $Th_1$, $Th_2$, $Th_3$, e.g., 0.2, 0.4, 0.6. The computer 110 may be programmed to actuate a vehicle 100 propulsion and/or brake actuator 120 to stop the vehicle upon selecting the "stop movement" mission.

TABLE 3

| Mode of navigation | Condition for mode of navigation |
|---|---|
| Cargo and passenger | D ≤ 0.2 |
| Cargo-only | 0.2 < D < 0.4 or D = 0.4 |
| No cargo or passenger | 0.4 < D < 0.6 |
| Stop movement | D ≥ 0.6 |

Additionally or alternatively, the mission may include a routing limitation(s), e.g., no freeway, and/or physical attributes limitation(s), e.g., maximum speed, etc. For example, the computer 110 may be programmed to select a "no freeway" mission upon determining that the damage quantifier D exceeds a threshold, e.g., 0.5. Thus, the computer 110 may be programmed to plan a route using conventional routing techniques, which lack any segment of the route to be on a freeway. Additionally or alternatively, the computer 110 may be programmed to limit the vehicle 100 speed by actuating the vehicle 100 propulsion based on a selected maximum speed, e.g., 80 kilometer/hour (kph), upon determining that the damage quantifier D exceeds a threshold, e.g., 0.5.

Figure 10:
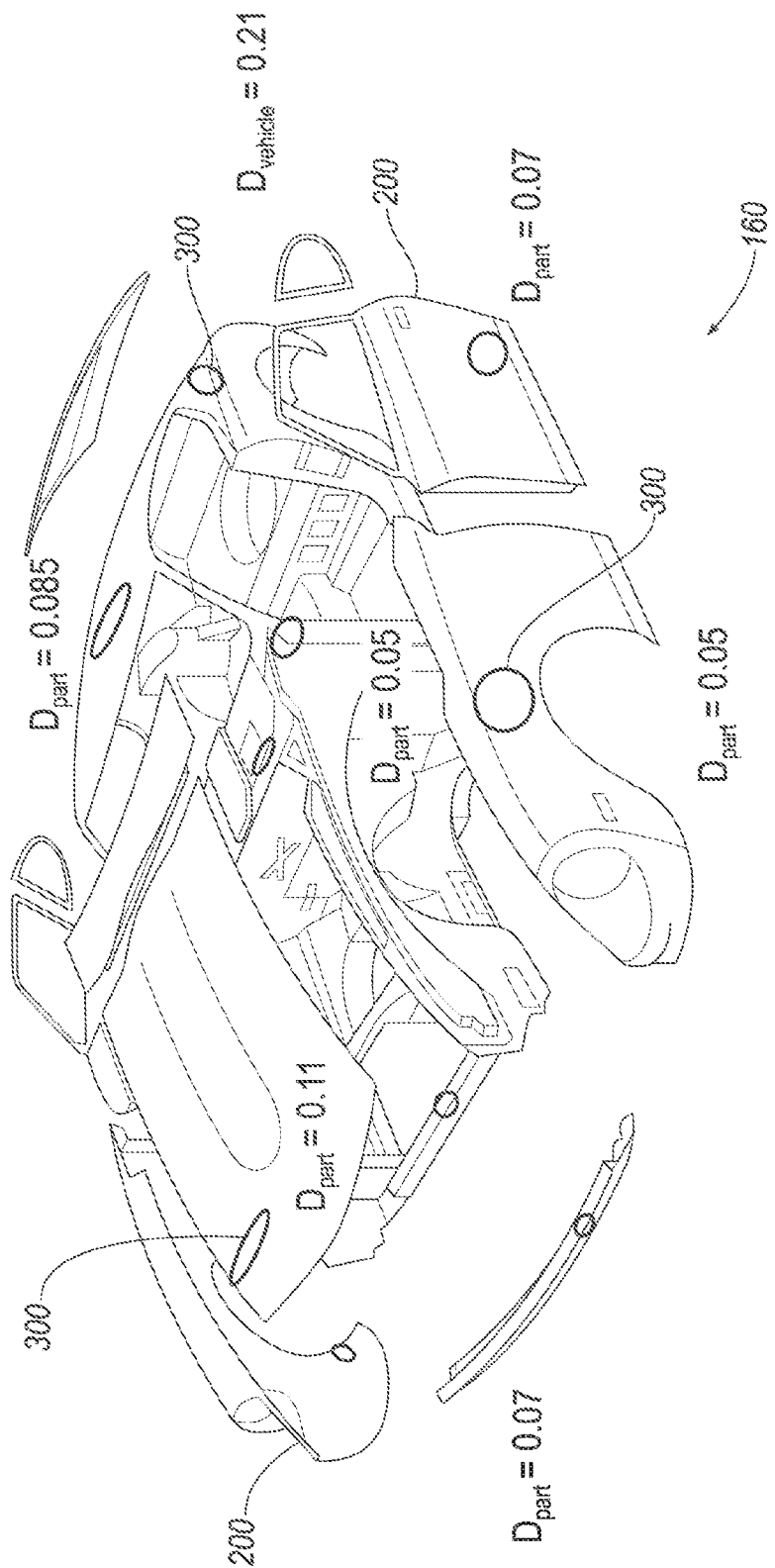
FIG. 10 is an example exploded diagram of the vehicle of FIG. 1 with damage in multiple body components.

FIG. 10 shows damages 300 in multiple components 200 of the vehicle 100 body 160. For example, the components 200 may include one or more damage detection sensors 130 to detect damages 300 in the respective component 200. The computer 110 may be programmed to determine a component damage quantifier D (or $D_{part}$) for the components 200. The computer 110 may be programmed to determine when an individual component 200 needs to be repaired or replaced based on the damage quantifier $D_{part}$ of the respective component 200. For example, the computer may be programmed to actuate the vehicle 100 to navigate to a service center for replacing a component 200 upon determining that the damage quantifier $D_{part}$ of the respective component exceeds a predetermined threshold, e.g., 0.5. Additionally, the computer 110 may be programmed to determine a vehicle damage quantifier $D_{vehicle}$ (or a damage quantifier $D_{vehicle}$ for the vehicle) based at least in part on the determined component damage quantifiers $D_{part}$. In one example, the computer 110 may be programmed to determine the vehicle damage quantifier $D_{vehicle}$ to be a maximum of determined components damage quantifier(s) d.

The computer 110 may be programmed to determine the vehicle damage quantifier $D_{vehicle}$ based on a combination of the component damage quantifiers D, local damage quantifiers d of the components 200, environmental conditions, a mechanical model of the vehicle 100 based on a machine learning technique. For example, a neural network may be trained based on the ground truth data, e.g., see Table 2, environmental conditions, and mechanical model of the vehicle 100.

As already discussed above, the computer 110 may be programmed to determine component damage quantifier D and/or vehicle damage quantifier $D_{vehicle}$ based on current (or present) data from damage detection sensors 130, other vehicle 100 sensors such as temperature, humidity, etc. sensors 130, etc. In addition, the computer 110 may be programmed to predict a change of damage quantifier D of a component 200 and/or the vehicle 100 based on received predictions of vehicle 100 route, expected cycles of use, weather conditions, and/or loading of the vehicle 100 (i.e., number of passenger, weight of cargo, etc.). For example, with respect to FIG. 10, the computer 110 may be programmed to predict a change of the damage quantifier D based on a predicted environmental condition, e.g., received temperature and/or humidity forecast data. As another example, the computer 110 may predict a change of the damage quantifier D based on a planned route, e.g., based on received data indicating a rough road as a part of the planned route and determined damage 300 in a suspension component 200 of the vehicle 100. In one example implementation, a prediction may be implemented using a rule-based technique. An example rule may include to predict an increase, e.g., 20%, of the damage quantifier D of any suspension component 200 upon determining that a planned route includes a rough surface, e.g., determined based on received map data. Such rules may be generated based on training a machine learning system.

In another example, an FEA model may include relationships of environmental conditions such as temperature, humidity, predicted weight of loads and/or passengers, etc. and component 200 mechanical responses, e.g., elastic deformation, inelastic deformation, fatigue degradation response, environmental interaction, degradation, energy absorption, etc. A lab computer may be programmed to simulate an FEA model under various conditions (i.e., various environmental conditions, loads, impacts, damages, etc.) and to generate simulation results. A machine learning model such as a neural network may be trained based on the simulation results (and/or real-world measurements as discussed below) to take the sensor 130 data, environmental data, planned route, etc. and to output predicted vehicle and/or component damage quantifier D.

In addition to predicting a change of damage quantifier D based on environmental conditions, planned route, etc., the computer 110 may be programmed to determine progress of the damage 300 over time and adjust a prediction of the damaged quantifier D. In the present context, "progress of damage" is an expansion, widening, and/or increased severity of a damage 300. For example, a widening of a crack damage 300 is a progress of damage 300. The computer 110 may determine a first damage quantifier D of a component 200 and a time $t_1$, and predict a second damage quantifier D at a time $t_2$ based on planned route, forecast of environmental conditions, etc. At the time $t_2$, the computer 110 may determine an actual damage quantifier D and may determine the progress of the damage based at least in part on the predicted second damage quantifier D and the actual determined damage quantifier at the time $t_2$. Thus, the computer 110 may be programmed to adjust a prediction of a third damage quantifier at a time $t_3$ based on the determined progress of the damage, e.g., based on a progressive damage modelling technique such as Hashin type criteria, Tsai Hill criteria, etc.

Figure 11:
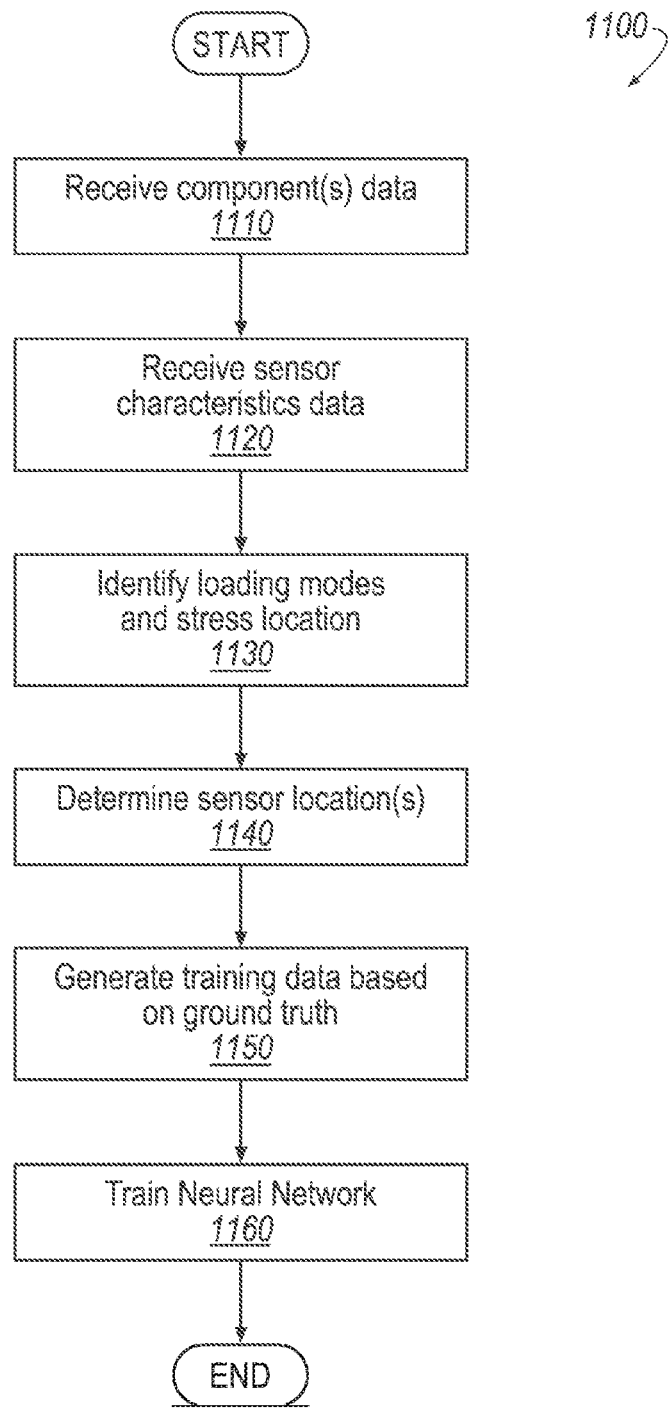
FIG. 11 is a flowchart of an exemplary process for determining optimized sensor locations.

FIG. 11 shows a flowchart of a process 1100 for identifying a number of and/or locations of the sensors 130 in a component 200. A lab computer or the like, i.e., a general-purpose computer such as may be used in a testing facility, may be programmed to execute blocks of the process 1100.

The process begins in a block 1110, in which the lab computer receives component 200 data. The lab computer may be programmed to receive Computer Aided Design (CAD) data specifying dimensions, shape, material, etc. of one or more components 200. The lab computer may be programmed to receive a FMEA, FEA model, etc., of the component 200 and/or the vehicle 100. The FMEA may include identifying failure modes of the component 200, and their causes and effects. In the context of a FMEA technique, "Failure modes" means ways, or modes, in which something may fail, i./e., cease to be usable for its intended function or operation. For example, crack in a pillar component 200 of the vehicle 100 may be described as one or more failure modes. Further, the lab computer may be programmed to receive material specification data, e.g., material elasticity, toughness, etc. The lab computer may be programmed to identify stress locations 210 based at least in part on FMEA data, e.g., location in which FMEA data indicate one or more failure modes.

Next, in a block 1120, the lab computer receives sensor 130 specification data. Sensor specification data, in the present context, means data describing a relationship of a physical attribute, e.g., conductance of ultrasound signal, capacitance, conductance of magnetic signals, etc., to a physical and/or electrical parameter, e.g., voltage amplitude, frequency, etc., of a signal received from the damage detection sensor 130.

Next, in a block 1130, the lab computer determines component 200 loading modes and stress locations 210 based on the received component design data, FMEA data, material specification data, etc. For example, utilizing an FEA technique, the lab computer may be programmed to determine stress locations 210 of the component 200 by simulating various loading modes, e.g., front crash, side crash, etc. of the vehicle 100.

Next, in a block 1140, the lab computer determines location(s) of respective damage detection sensor(s) 130 in the component 200. The lab computer may be programmed to determine the number and/or locations of the sensors 130 based on the identified stress locations 210 and/or identified loading modes. In one example, the lab computer may be programmed to determine the locations of the sensors 130 such that at least one sensor 130 is located at each of the identified stress locations 210, e.g., including a transmitter and a receiver (an imaginary line connecting the transmitter and the receiver may intersect the respective stress location 210). In one example, the lab computer may be programmed to determine locations of sensors 130 based on each of the loading modes, e.g., front impact loading mode and roof crash loading mode (see FIGS. 2A-2B). In another example, the lab computer may be programmed to select one or more types of loading mode for detection, and to identify the sensor 130 locations based on the selected types of loading mode. For example, the lab computer may be programmed to select a frontal impact loading mode (e.g., the example loading mode shown in FIG. 2A), and to identify the damage detection sensor 130 locations based on the selected loading mode. Additionally or alternatively, the lab computer may be programmed to determine location of sensors 130 based on the received sensor characteristics data. For example, the lab computer may determine a first location for a transducer sensor 130 whereas a second location for an ultrasonic sensor 130. In other words, a location of sensor 130 may be based on characteristics of the sensor 130, e.g., range of detection, precision, etc.

Next, in a block 1150, the lab computer may be programmed, using FEA, FMEA, etc., to generate training data, e.g., example Table 2, based on simulating damages 300 applied to the component 200. Additionally or alternatively, the lab computer may be programmed to receive measurements data from a lab measurement equipment, e.g., x-ray, ultrasound scanner, etc. The received data may include data collected at a time of inspecting a vehicle 100 in a service center.

Next, in a block 1160, the lab computer 110 trains an artificial (or non-biological) neural network based on the generated training data. Following the block 1160, the process 1100 ends, or alternatively returns to the block 1110, although not shown in FIG. 11.

Figure 12:
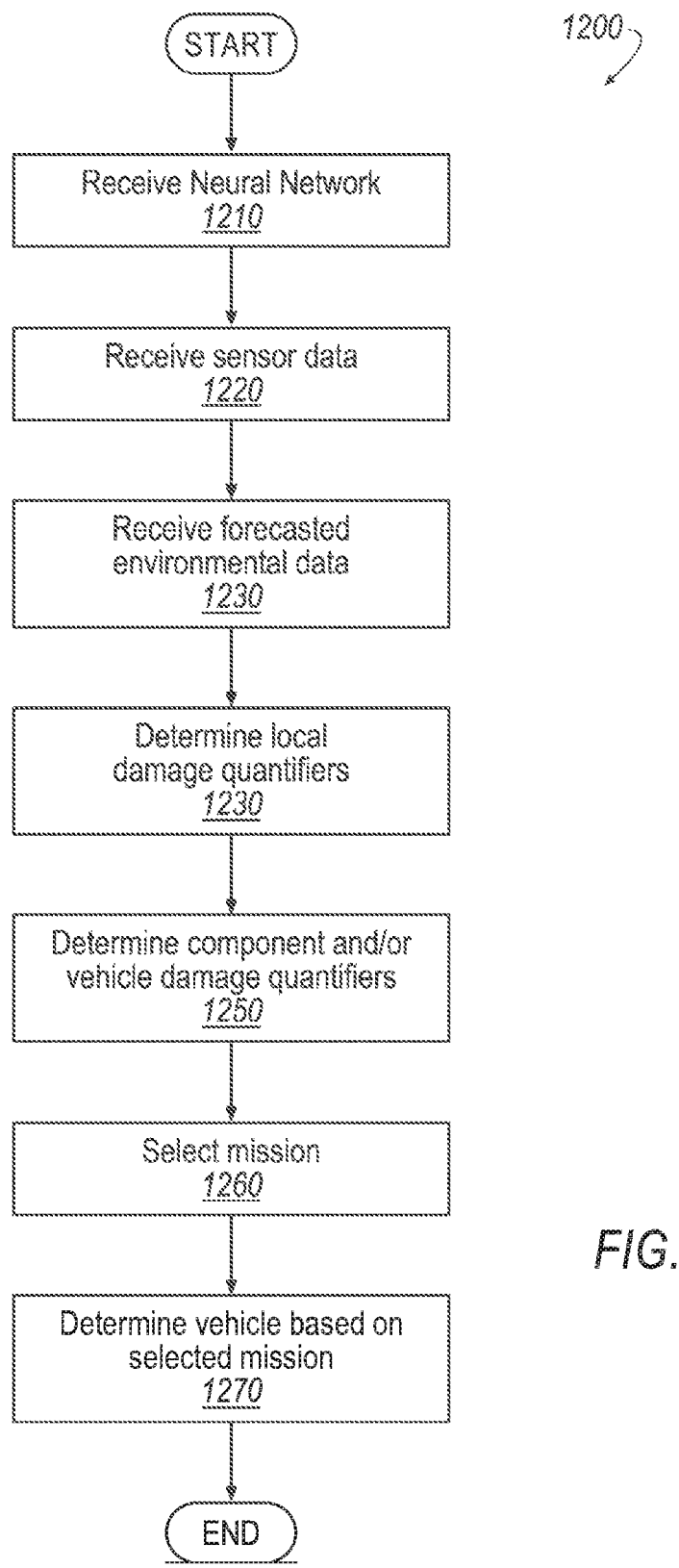
FIG. 12 shows an exemplary flowchart for performing vehicle operation.

FIG. 12 is a flowchart of an example process 1200 for performing vehicle 100 operation. A vehicle 100 computer 110 may be programmed to execute blocks of the process 1200.

The process 1200 begins in a block 1210, in which the computer 110 receives neural network data. In one example, the computer 110 may be programmed to receive neural network data during a manufacturing step of programming the computer 110. Additionally, the computer 110 may be programmed to receive updated neural network (or re-trained neural network data) from a remote computer via a wireless network, e.g., in a periodic manner and/or upon an availability of an updated neural network on the remote computer.

Next, in a block 1220, the computer 110 receives vehicle 100 sensor 130 data. The computer 110 may be programmed to receive data from damage detection sensors 130 included in the vehicle 100 body 160 (e.g., in multiple components 200).

Next, in a block 1230, the computer 110 receives environmental data. The computer 110 may be programmed to receive environmental data from vehicle 100 sensors 130 such as temperature, pressure, speed, acceleration, etc. sensors 130. The computer 110 may be programmed to receive, from a remote computer, environmental data such as predicted weather data, road data, etc. Additionally, the computer 110 may be programmed to receive planned route data.

Next, in a block 1240, the computer 110 determines local damage quantifiers d. The computer 110 may be programmed to determine the local damage quantifiers d for each location in which a damage detection sensor 130 is placed, based on the received sensor 130 data. Thus, the computer 110 may be programmed to determine one or more local damage quantifiers d for each of the components 200 based on a specified relationship between received sensor 130 data and the local damage quantifier d, an example being illustrated in Table 1 above.

Next, in a block 1250, the computer 110 determines component and/or vehicle damage quantifiers D. The computer 110 may be programmed to determine the damage quantifiers D based on received damage detection sensor 130 data, environmental data, and the received neural network model. Additionally, the computer 110 may be programmed to predict a change of the damage quantifier D based on the predicted environmental data, planned route data, etc. Additionally, the computer 110 may be programmed to predict an adjusted progression of a previously detected damage 300 based on received sensor 130 data and a comparison of previously predicted change of damage quantifiers D and a currently determined damaged quantifier D.

Next, in a block 1260, the computer 110 selects a mission for the vehicle 100 based on the determined component and/or vehicle damage quantifier D. In one example, the computer 110 may select a mission from one of modes of navigation including cargo-only, cargo and passenger, move with no cargo or passenger, and/or stop movement. In another example, the computer 110 may select a mission including one of a speed limitation (i.e., determining a maximum allowed vehicle 100 speed), road type limitation (e.g., no freeway), etc.

Next, in a block 1270, the computer 110 operates the vehicle 100 based on the selected mission. In one example, the computer 110 may be programmed to select a mission, e.g., a mode of navigation, as illustrated regarding example Table 3 above. The computer 110 may be programmed to actuate a vehicle 100 propulsion and/or brake actuator 120 to stop the vehicle upon selecting the "stop movement" mission. Additionally or alternatively, upon selecting the mission "move no cargo or passenger", the computer 110 may be programmed to navigate the vehicle 100 to a nearest service center for repair if the vehicle 100 is movable; otherwise, the computer 110 may be programmed to stop the vehicle 100 or navigate the vehicle at least to a road side to prevent road blockage.

In another example, the computer 110 may be programmed to operate the vehicle 100 with a reduced speed upon determining a mission including a maximum allowed speed. In yet another example, the computer 110 may be programmed to reroute the vehicle 100, e.g., upon determining a mission including a limitation of "no freeway." Thus, the computer 110 may be programmed to plan a second route that lacks any freeway. Following the block 1270, the process 1200 ends, or returns to the block 1210, although not shown in FIG. 12.

As discussed above, a neural network may be trained based on FEA results, FMEA, etc. In one example, the neural network may be trained based on failure modes included in the FMEA data. Additionally, the neural network may be trained based on ex situ measurements while the vehicle may be stationary, e.g., scanning or inspection tools or the like that can include ultrasonic, x-ray inspection, vibrography, and/or other techniques that scan a surface of vehicle 100 body 160 to detect damages 300. In the present context, "ex situ" measurement is a measurement performed by a device that is not included in the vehicle 100, e.g., in a lab, a service center inspection equipment, vehicle 100 depot, etc. Such methods provide a more direct detection and imaging of damage 300 in CFRP components 200. A lab computer may be programmed to generate training data for the neural network. The training data may include ground truth data such as shown in the example provided in Table 4.

TABLE 4

| Data item(s) | Description |
| --- | --- |
| Scan data | Data including type of damages, location of damages, dimension, severity, etc. of damages. |
| Local damage quantifier(s) d for each of detected damages | Determined by the vehicle computer based on vehicle sensor data and pre-stored programming of vehicle computer |
| Component and/or vehicle damage quantifier D | Determined by the vehicle computer based on pre-stored neural network model, programming, etc. |

During inspection and maintenance of a vehicle 100, a damage 300 identified measurements from scanning tools or the like, may be used to improve damage detection techniques and to predict the component damage quantifier D based on environmental conditions, sensor 130 data, etc. Typically, scanning tools or the like provide higher precision data compared to vehicle 100 sensors 130. Such higher precision data collected from a scanning or inspection tool can be used to re-train the neural network.

For example, the neural network may be re-trained based on collected re-training data, e.g., as illustrated in Table 4. In one example, "re-training" may include updating weights of network nodes (of a standard neural network, a Bayesian neural network, etc.) using gradient descent to minimize a loss (error) of the network. The re-training data collected based on scanning tool data (herein referred to as re-training data because the neural network has been originally trained before deployment in the vehicle 100 computers) may be stored in a lab computer. The lab computer may be programmed to re-train the neural network based on the re-training data received, e.g., via a wide area communication network from a service center computer. The lab computer may be programmed to update vehicle 100 computers 110 based on the re-trained neural network. In one example, the remote computer 110, via a wired and/or wireless network communication, may overwrite an existing programming of multiple computers 110 (e.g., computers 110 in a fleet of vehicles 100) based on the re-trained neural network.

Figure 13:
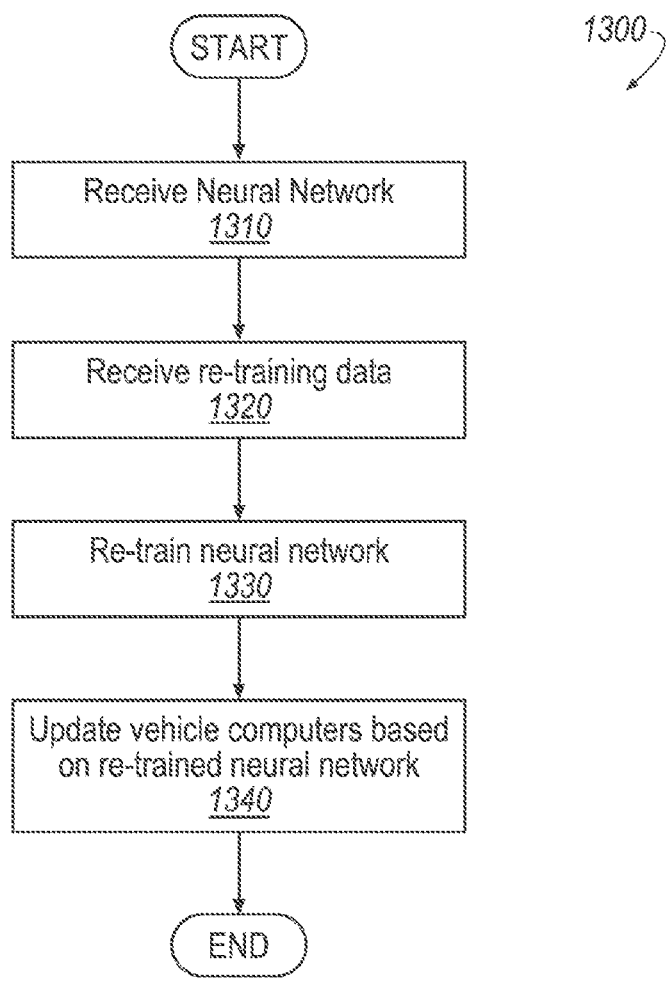
FIG. 13 shows an exemplary flowchart for re-training a neural network model.

FIG. 13 shows a flowchart of an example process 1300 for re-training (or updating) of a neural network that determines the damage quantifiers D. For example, a lab computer, i.e., a general-purpose computer in a testing, manufacturing, or fleet management facility, may be programmed to execute blocks of the process 1300.

The process 1300 begins in a block 1310, in which the remote computer receives neural network data and/or any other machine learning algorithm data for determining the damage quantifiers D, local damage quantifier d, and/or vehicle damage quantifier $D_{vehicle}$. In one example, the remote computer may receive the neural network data from a remote computer memory. The neural network data include data that describes the neural network model.

Next, in a block 1320, the remote computer receives re-training data, e.g., from a service center computer. The remote computer may be programmed to receive re-training data including ground truth such as illustrated by Table 4. The received re-training data may include measurement data collected by scanning tools, etc. in the respective service center and determined sensor 130 data, local damage quantifiers d, and/or component and/or vehicle damage quantifiers D received from the vehicle computer 110.

Next, in a block 1330, the remote computer re-trains the neural network of the vehicle 100 computer 110. The remote computer may be programmed to identify the neural network of the vehicle 100 computer 110 and to re-train the neural network based on the received re-train data. In one example, most recent updates of neural network models may be stored on a remote computer memory and the remote computer may be programmed to identify the neural network for the respective vehicle 100 type based on a vehicle 100 model number, etc., which may be included in the received data from the service center computer.

Next, in a block 1340, the remote computer updates the vehicle 100 computer 110 based on the re-trained neural network. For example, the remote computer 110 may be programmed to transmit, via a wireless and/or wired communication network, re-trained neural network data (e.g., using Bayesian Neural Network technique) to the vehicle 100 computer 110. Additionally, the remote computer may be programmed to update the computers 110 of a fleet of the vehicles 100 based on the re-trained neural network.

Following the block 1340, the process 1300 ends, or alternatively returns to the block 1310, although not shown in FIG. 13.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Python, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   prior to deployment of a vehicle, identifying stress locations in a first vehicle component for one or more types of loading modes of the first vehicle component, based on inputting the loading modes and data describing the component to a simulation that outputs the stress location;
   wherein respective types of loading modes specify directional forces to the first vehicle component when a plurality of vehicle components receive one or more forces from an impact to the vehicle;

identifying a plurality of sensor locations in the vehicle component for the plurality of sensors based on the identified stress locations in the vehicle component that specify the directional forces to the vehicle component; and mounting the plurality of the sensors at the identified sensor locations.

2. The method of claim 1, further comprising:

upon deployment of the vehicle, determining a damage quantifier for a vehicle component formed of composite material based on vehicle sensor data; and operating the vehicle based on a mission determined according to determined damage quantifier.

3. The method of claim 2, wherein determining the mission includes selecting, based on the determined damage quantifier, a mode of navigation from at least one of cargo-only, cargo and passenger, move with no cargo or passenger, stop movement.

4. The method of claim 3, further comprising selecting the mode of navigation based on a plurality of damage quantifier thresholds.

5. The method of claim 2, further comprising predicting a change of the damage quantifier based on at least one of (a) a planned route of the vehicle including data specifying whether the planned route includes a rough road surface, or (b) environmental sensor data including at least one of a vehicle speed, an ambient temperature, and an ambient humidity.

6. A vehicle comprising:

a plurality of sensors; and a computer, comprising a processor and a memory, the memory storing instructions executable by the processor to:

prior to deployment of a vehicle, identify stress locations in a first vehicle component for one or more types of loading modes of the first vehicle component, based on inputting the loading modes and data describing the component to a simulation that outputs the stress location;

wherein respective types of loading modes specify directional forces to the first vehicle component when a plurality of vehicle components receive one or more forces from an impact to the vehicle; and identifying a plurality of sensor locations in the vehicle component for the plurality of sensors based on the identified stress locations in the vehicle component that specify the directional forces to the vehicle component; and wherein the plurality of the sensors are mounted at the identified sensor locations.

7. The vehicle of claim 6, wherein the instructions further include instructions to:

upon deployment of the vehicle, determine a damage quantifier for a vehicle component formed of composite material based on vehicle sensor data; and operate the vehicle based on a mission determined according to determined damage quantifier.

8. The system of claim 7, wherein the instructions further include instructions to predict a change of the damage quantifier based on at least one of (a) a planned route of the vehicle including data specifying whether the planned route includes a rough road surface, or (b) environmental sensor data including at least one of a vehicle speed, an ambient temperature, and an ambient humidity.

9. The system of claim 7, wherein the instructions further include instructions to determine the damage quantifier based on a model that takes the received data from the sensors included in the vehicle component as input, and outputs the damage quantifier for the respective vehicle component.

10. The system of claim 7, wherein the types of loading modes include at least one of a roof impact, a frontal impact, a rear impact, and a side impact.

11. The system of claim 7, wherein the instructions to determine the mission further include instructions to select, based on the determined damage quantifier, a mode of navigation from at least one of cargo-only, cargo and passenger, move with no cargo or passenger, stop movement.

12. The system of claim 11, wherein the instructions further include instructions to select the mode of navigation based on a plurality of damage quantifier thresholds.

13. The system of claim 10, wherein the instructions further include instructions to:

select one or more types of loading modes for detection; and identify the plurality of sensor locations based on the selected one or more types of loading modes.

14. The method of claim 2, further comprising determining a vehicle damage quantifier based on a combination of a plurality of component damage quantifiers.

15. The method of claim 2, further comprising training a neural network for determining the damage quantifier using ground truth data generated based on simulating an effect of the damage on physical attributes of the component or measurement data received from a lab measurement equipment including at least one of X-Ray and an ultrasound scanner.

16. The method of claim 5, wherein predicting the change of the damage quantifier further includes predicting a first damage quantifier based on a first safety standard, predicting a second damage quantifier based on a second safety standard and determining the predicted damage quantifier based on the first and second damage quantifiers.

17. The system of claim 7, wherein the instructions further include instructions to determine the damage quantifier based on a combination of a plurality of component damage quantifiers.

18. The system of claim 7, wherein the instructions further include instructions to train a neural network for determining the damage quantifier using ground truth data generated based on simulating an effect of the damage on physical attributes of the component or measurement data received from a lab measurement equipment including at least one of X-Ray and an ultrasound scanner.

19. The system of claim 8, wherein the instructions further include instructions to predict the change of the damage quantifier by predicting a first damage quantifier based on a first safety standard, predicting a second damage quantifier based on a second safety standard and determining the predicted damage quantifier based on the first and second damage quantifiers.

20. The system of claim 19, wherein the instructions further include instructions to determine the predicted damage quantifier by determining a maximum of the first damage quantifier and the second damage quantifier.

* * * * *